US009440557B2

(12) United States Patent
Müeller et al.

(10) Patent No.: US 9,440,557 B2
(45) Date of Patent: Sep. 13, 2016

(54) LOCKING DEVICE

(75) Inventors: Peter Müeller, Mackenbach (DE); Volker Windecker, Sippersfeld (DE); Stefan Haber, Pirmasens (DE); Kadir Yasaroglu, Bursa (TR); Silke Labuk, Weilerbach (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 236 days.

(21) Appl. No.: 14/115,805

(22) PCT Filed: Apr. 16, 2012

(86) PCT No.: PCT/EP2012/001626
§ 371 (c)(1),
(2), (4) Date: Jan. 13, 2014

(87) PCT Pub. No.: WO2013/020612
PCT Pub. Date: Feb. 14, 2013

(65) Prior Publication Data
US 2014/0348578 A1    Nov. 27, 2014

(30) Foreign Application Priority Data

May 6, 2011    (DE) .................. 10 2011 101 284

(51) Int. Cl.
*B60N 2/015*    (2006.01)
*B60N 2/44*    (2006.01)
(Continued)

(52) U.S. Cl.
CPC ....... *B60N 2/01583* (2013.01); *B60N 2/01541* (2013.01); *B60N 2/366* (2013.01); *B60N 2/44* (2013.01); *B60N 2/442* (2013.01); *Y10T 403/595* (2015.01)

(58) Field of Classification Search
CPC .......... B60N 2/01541; B60N 2/01583; B60N 2/366; B60N 2/44; B60N 2/442; E05C 3/30
USPC ....... 403/322.1, 322.3, 322.4, 325–328, 330; 297/378.13; 296/65.03
See application file for complete search history.

(56) References Cited

U.S. PATENT DOCUMENTS 6,126,212 A * 10/2000 Fujihara ............... E05B 85/243
292/216
7,357,436 B2 * 4/2008 Willing .............. B60N 2/01583
296/65.03
(Continued)

FOREIGN PATENT DOCUMENTS

DE         103 32 912 B3     3/2005
DE     2020060 00 884 U1     4/2006
(Continued)

OTHER PUBLICATIONS

International Search Report mailed Jul. 5, 2012, as received in corresponding International Patent Application No. PCT/EP2012/001626.

*Primary Examiner* — Josh Skroupa
(74) *Attorney, Agent, or Firm* — Foley & Lardner LLP

(57) ABSTRACT

A locking device for a vehicle seat, includes a pawl for locking a mating element, which pawl is pivotally supported about a first axis, and a tensioning eccentric that is pivotally supported about a second axis, which is parallel to the first axis, between a locking position and an unlocking position and ensures a locked state of the pawl owing to the interaction with a first functional surface of the pawl, the tensioning eccentric acting upon the first functional surface by a tensioning surface when spring-loaded and locked, an unlocking element being pivotable about the first axis counter to a spring force from a locking position to an unlocking position by an actuation device and the tensioning eccentric being pivotally engaged by the unlocking element from its locking position towards its unlocking position.

7 Claims, 4 Drawing Sheets

(51) Int. Cl.
*E05C 3/30* (2006.01)
*B60N 2/36* (2006.01)

(56) References Cited

U.S. PATENT DOCUMENTS 7,475,922 B2 * 1/2009 Ottino ................ E05B 85/26
292/216

8,029,030 B2 * 10/2011 Shimura ............ B60N 2/01583
296/65.03

FOREIGN PATENT DOCUMENTS

DE    1020070 16 409 A1    10/2008
EP         2 141 312 A1     1/2010

* cited by examiner

LOCKING DEVICE

CROSS REFERENCE TO RELATED APPLICATIONS

The present application is a U.S. National Stage of International Application No. PCT/EP2012/001626, filed on Apr. 16, 2012, which claims the benefit of German Patent Application No. 10 2011 101 284.6, filed on May 6, 2011, the entire disclosures of all of which are incorporated herein by reference.

The invention relates to a locking device for a vehicle seat.

PRIOR ART

One possibility for using locking devices of this type consists in serving to attach a vehicle seat to the floor in a motor vehicle.

In the locked state, the clamping eccentric exerts a closing moment on the pawl via the clamping face.

DE 10 2007 016 409 A1 has disclosed a locking device of this type for a vehicle seat, which locking device comprises a pawl and a clamping eccentric.

A similar locking device which additionally has a scanning device for the position of the clamping eccentric is disclosed in DE 20 2006 000 884 U1.

DE 103 32 912 B3 discloses a locking device which has a separate unlocking element which acts on the clamping eccentric in order to unlock the locking device.

OBJECT

It is an object of the invention to provide a locking device of the type mentioned at the outset, which locking device requires a small amount of installation space and has a low weight.

SOLUTION

According to the invention, this object is achieved by virtue of the fact that an unlocking element can be pivoted by an actuating device counter to a spring force about the first axis from a locked condition into an unlocked condition, and the clamping eccentric can be moved by the unlocking element from its locked condition into its unlocked condition.

This configuration produces a locking device which consists of few and simple components which can be assembled easily.

The required installation space and the weight of the locking device are low on account of the few components.

If a catching eccentric which is mounted such that it can be pivoted about the second axis can be driven by the unlocking element such that it can be moved from its locked position into its unlocked position, which catching eccentric secures a locked state of the pawl by way of interaction with the first functional face of the pawl, it being possible for the pawl to be supported in the locked state by a catching face of the catching eccentric, the catching eccentric supports, by way of the catching face, the pawl on its first functional face in a locked locking device in the case of a crash.

In a simple way, both a motion loading of the catching eccentric and, lagging this, a motion loading of the clamping eccentric in the direction of the unlocked position and the unlocked location, respectively, take place by way of the unlocking element if the clamping eccentric and the catching eccentric are mounted such that they can be pivoted parallel to one another about the second axis, and the unlocking element has a radially protruding lug which extends axially over the width of the clamping eccentric and catching eccentric, in the case of pivoting of the unlocking element from its locked condition into its unlocked condition the lug moving the catching eccentric, via a radially protruding catching eccentric driver of the catching eccentric, from its locked position into its unlocked position and, lagging this movement, moving the clamping eccentric from its locked location into its unlocked location via a radially protruding clamping eccentric driver of the clamping eccentric.

An unlocking slave is advantageously provided which is mounted such that it can be pivoted about the second axis from a locked condition into an unlocked condition.

According to one advantageous refinement of the invention, the unlocking slave is coupled via a driving coupling to the unlocking element in such a way that the unlocking slave can be driven such that it can be moved from its locked condition into its unlocked condition by way of a pivoting movement of the unlocking element from the locked condition into the unlocked condition.

According to a further advantageous refinement of the invention, the unlocking slave is coupled via a driving coupling to the unlocking element in such a way that the unlocking slave can be driven such that it can be moved from its locked condition into its unlocked condition by way of a pivoting movement of the unlocking element from the unlocked condition into the locked condition.

Here, the unlocking element can serve as signal transducer for indicating the locking state of the locking device.

However, there are therefore also two separate points of action for actuating devices, namely the unlocking element and the unlocking slave, which makes a variable actuating attachment possible.

The actuating devices can therefore be arranged at different points in the vehicle and the locking device can be actuable by every actuating device. Here, one actuating device can be arranged in the passenger compartment and the other actuating device can be arranged in the trunk.

A Bowden cable, an electric drive or a drive of another type can act in each case on the unlocking slave and/or the unlocking element for direct actuation or for remote actuation.

A prestressed pawl compression spring can be supported with its one end on an arm of the clamping eccentric so as to spring-load the latter into its locked location and can load the pawl in the unlocking direction with its other end.

As a result of this configuration, in addition to the function of the exertion of a closing moment on the pawl in the locked state, the clamping eccentric also fulfils the function of the ejection of the counterelement when the locking device is unlocked, with the result that an integrated ejection function, which reduces installation space, of the counterelement with high ejection force when the locking device is unlocked is produced. At the same time, however, the locking forces which act on the pawl during the pivoting in of the counterelement which is fixed to the vehicle are low.

In order to reset the unlocking element, the catching eccentric can be spring-loaded in the direction of its locked position by a prestressed spring and can be coupled to the catching eccentric. Here, the catching eccentric drives the unlocking element, which is no longer spring-loaded in the unlocking direction, into its locked condition.

In a simple way, the coupling between the catching eccentric and unlocking element consists in that the catching eccentric has a driving recess which extends concentrically with respect to the second axis, the radial boundary of which in the unlocking direction is formed by the catching eccentric driver, and the radial boundary of which in the locking direction is formed by a driving wall.

The object is also achieved by a vehicle seat having the features described further herein.

FIGURES AND EMBODIMENTS OF THE INVENTION

In the following text, the invention is explained in greater detail using advantageous exemplary embodiments which are shown in the drawings. However, the invention is not restricted to said exemplary embodiments. In the drawings.

Figure 1:
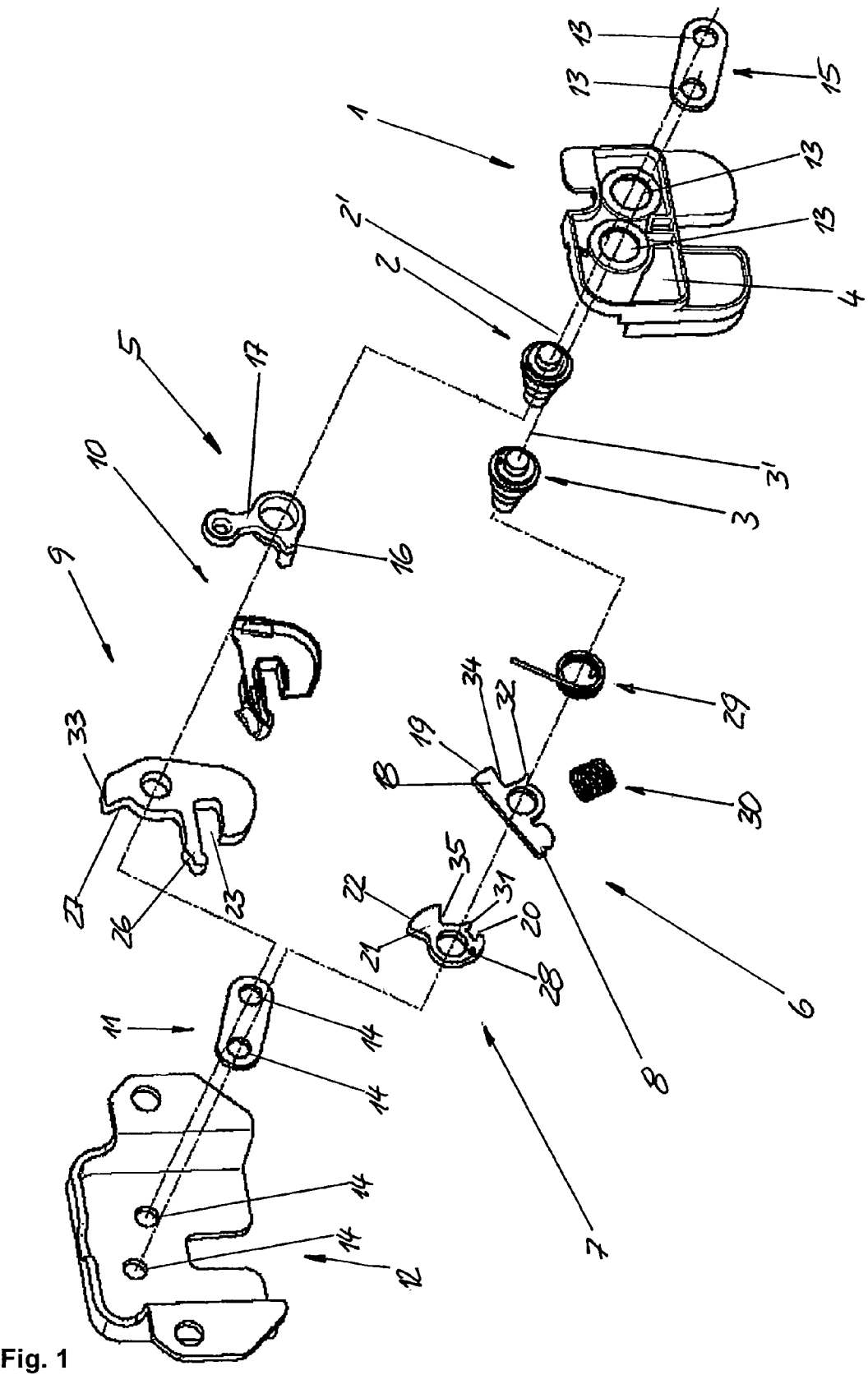
FIG. 1 shows an exploded illustration of a first exemplary embodiment of a locking device.
Figure 2:
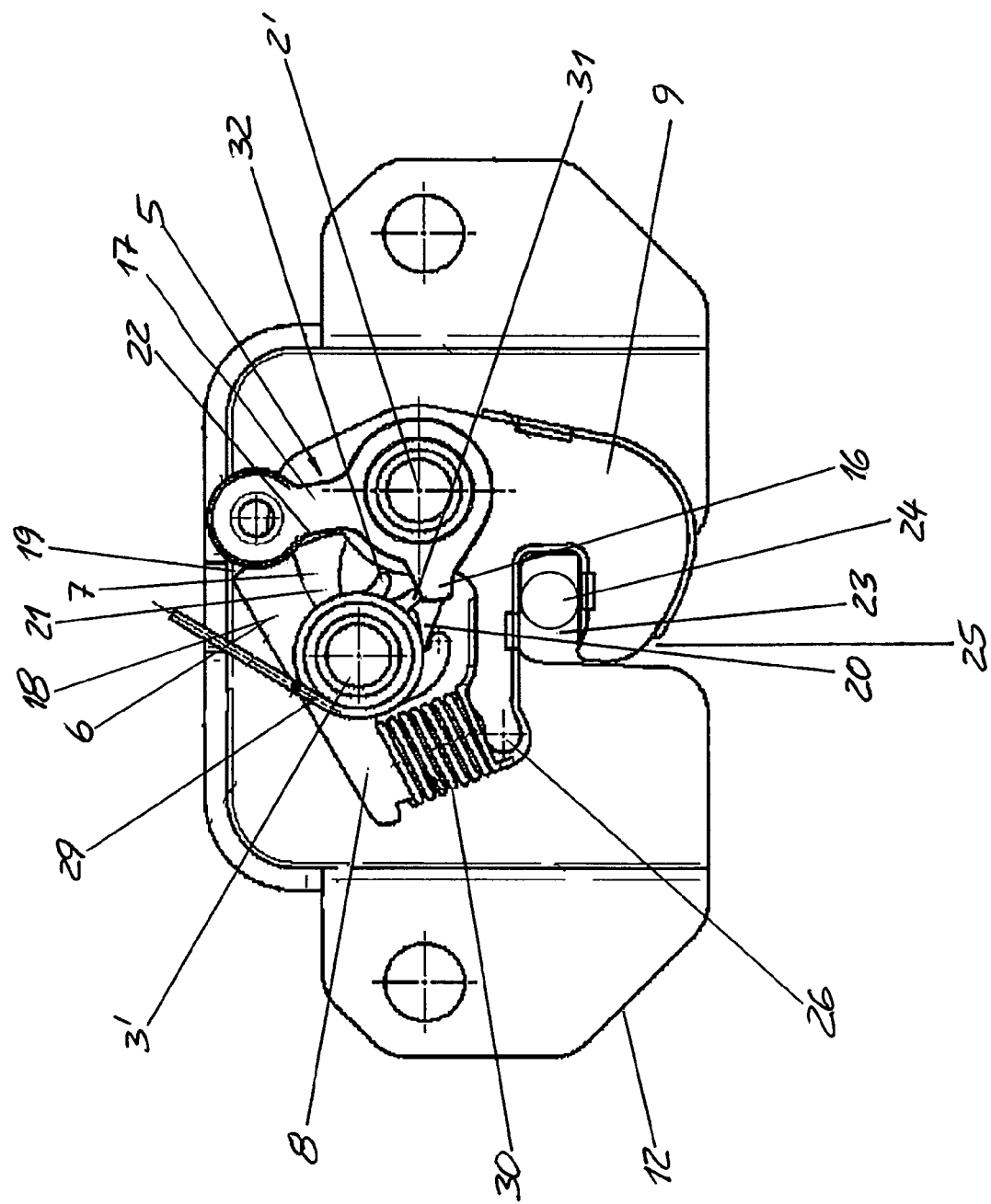
FIG. 2 shows a front-side inner view of the locking device according to FIG. 1 in the locked position.

The locking device according to the first exemplary embodiment which is shown is arranged on a floor region of a vehicle seat and has a cup-like housing 1, in which a first axle pin 2 and a second axle pin 3 are arranged fixedly parallel to one another so as to extend transversely with respect to the floor 4 of the housing 1.

A clamping eccentric 6 and a catching eccentric 7 are mounted parallel to one another on the second axle pin 3 such that they can be pivoted about a second axis 3'.

An unlocking element 5 and a pawl 9 are mounted parallel to one another on the first axle pin 2 such that they can be pivoted about a first axis 2', a cover 10 being clipped onto the pawl 9.

The first axle pin 2 and the second axle pin 3 are mounted with their free ends in bearing holes 13 of the floor 4 and a first coupling plate 15 which bears against the outer side of the floor 4.

The first axle pin 2 and the second axle pin 3 are mounted with their other free ends in bearing holes 14 of a second coupling plate 11 and a housing cover 12.

The unlocking element 5 has a radially protruding lug 16. An actuating arm 17 of the unlocking element 5 extends radially at approximately 90 degrees with respect to the lug 16, on which actuating arm 17 a Bowden cable can act, by way of which the actuating arm 17 can be pivoted in the clockwise direction into its unlocked condition.

The clamping eccentric 6 has a substantially radially extending spring action arm 8 and, diametrically with respect thereto, a clamping face arm 18 which has a clamping face 19 at its free end.

Extending radially at approximately 90 degrees with respect to a driving recess 20, the catching eccentric 7 has a catching face arm 21 which has a catching face 22 at its free end.

The pawl 9 has a hook throat 23 which interacts with a pin 24, as counterelement, which is arranged fixedly, for example, on a floor of a vehicle, and, in the locked state of the locking device, perpendicularly crosses a pin receptacle 25 which is formed in the housing 1. In the open state, the hook throat 23 opens obliquely toward the pin receptacle 25.

The hook throat 23 is delimited at the top by a finger 26 of the pawl 9, the width, defined in this way, of the hook throat 23 being slightly greater than the diameter of the pin 24.

Furthermore, the pawl 9 has a first functional face 27 which, in the locked position, points approximately in the direction of the second axle pin 3. The first functional face 27 is configured, for example, to be concave and curved in a circularly annular manner.

The clamping eccentric 6 and the catching eccentric 7 in each case have a smaller width than the pawl 9 and are both arranged so as to lie opposite the pawl 9.

The catching eccentric 7 is prestressed into its locked condition by a prestressed spiral coiled spring 29 which is supported with its one end on the housing 1 and protrudes with its other end into an opening 28 which is formed in the catching eccentric 7 at a radial spacing from the second axis 3'.

A prestressed pawl compression spring 30 is arranged between the spring action arm 8 of the clamping eccentric 6 and the finger 26 of the pawl 9.

In the locked state, the clamping eccentric 6 exerts a closing moment on the pawl 9 via the clamping face 19 which is curved eccentrically with respect to the second axle pin 3 and is in non-selflocking contact with the first functional face 27. The clamping face 19 is configured, for example, to be convex and curved in a circularly annular manner.

The catching face 22 of the catching eccentric 7 is situated in the vicinity of the clamping face 19, but spaced apart from the first functional face 27 in the locked state. The catching face 22 is configured, for example, to be convex and curved in a circularly annular manner. In the case of a crash when the pawl 9 possibly experiences an opening moment and presses the clamping eccentric 6 away, the catching face 22 comes into contact with the first functional face 27 in order to support the pawl 9 and in order to prevent the latter from opening.

As a result of the movement of the actuating arm 17 out of the locked state which is shown, the lug 16 of the unlocking element 5 pivots in the clockwise direction and in the process drives a radially protruding catching eccentric driver 31, as a result of which the catching eccentric 7 is pivoted in the counterclockwise direction out of its locked position.

After a short pivoting path, the lug 16 additionally comes into contact with a radially protruding clamping eccentric driver 32 and therefore also pivots the clamping eccentric 6 out of its locked location. As a result, the catching eccentric 7 pivots away from the pawl 9 and moves with its catching face 22 away from the first functional face 27.

At the same time, the clamping eccentric 6 also pivots away from the pawl 9 and moves with its clamping face 19 away from the first functional face 27. The pawl 9 is therefore no longer secured.

Here, the pawl 9 is moved suddenly into its unlocked condition by way of the prestressed pawl compression spring 30 which loads the clamping eccentric 6 in the direction of its locked location with its one end and loads the pawl 9 in the unlocking direction with its other end, and, as a result, the pin 24 which is situated in the hook throat 23 and the pin receptacle 25 is ejected out of the hook throat 23 and the pin receptacle 25 by the finger 26.

Here, the pawl 9 is pushed past the clamping eccentric 6 and past the catching eccentric 7 by way of a second functional face 33 which is configured substantially transversely with respect to the first functional face 27.

If the loading in the unlocking direction of the actuating arm 17 is ended, the prestressed spiral coiled spring 29 presses the catching eccentric 7 and therefore the unlocking element 5 in the locking direction.

Here, the clamping eccentric 6 is pressed against the second functional face 33 by way of the pawl compression spring 30 and bears with a bearing face 34 against the second functional face 33, the surface perpendicular of the second functional face 33 and the bearing face 34 running in front of the center of the second axle pin 3 and the hook throat 23. The clamping eccentric 6 therefore exerts an opening moment on the pawl 9 via the bearing face 34, which opening moment holds said pawl 9 open.

The catching eccentric 6 has a bearing face 35 which is normally at a small spacing from the second functional face 33 in the locked state and comes into contact with the second functional face 33 only in the case of a crash. The surface perpendicular of the bearing face 35 also runs in front of the center of the second axle pin 3 and the hook throat 23. The pin 24 which is fixed to the vehicle is pressed against the housing 1 by way of the closing force of the clamping eccentric 6, which closing force acts on the pawl 9.

When the pin 24 passes again into the pin receptacle 25 and into contact with the finger 26, the pin 24 presses the pawl 9 in the locking direction.

The unlocking element 5 which is no longer loaded in the unlocking direction is then pivoted into its locked condition by the catching eccentric 7 which is loaded in the locking direction by the spiral coiled spring 29, by the catching eccentric driver 31 loading the lug 16 of the unlocking element 5.

It goes without saying that the locking device can be arranged at any point of a vehicle seat and can interact with a counterelement of a vehicle.

Figure 3:
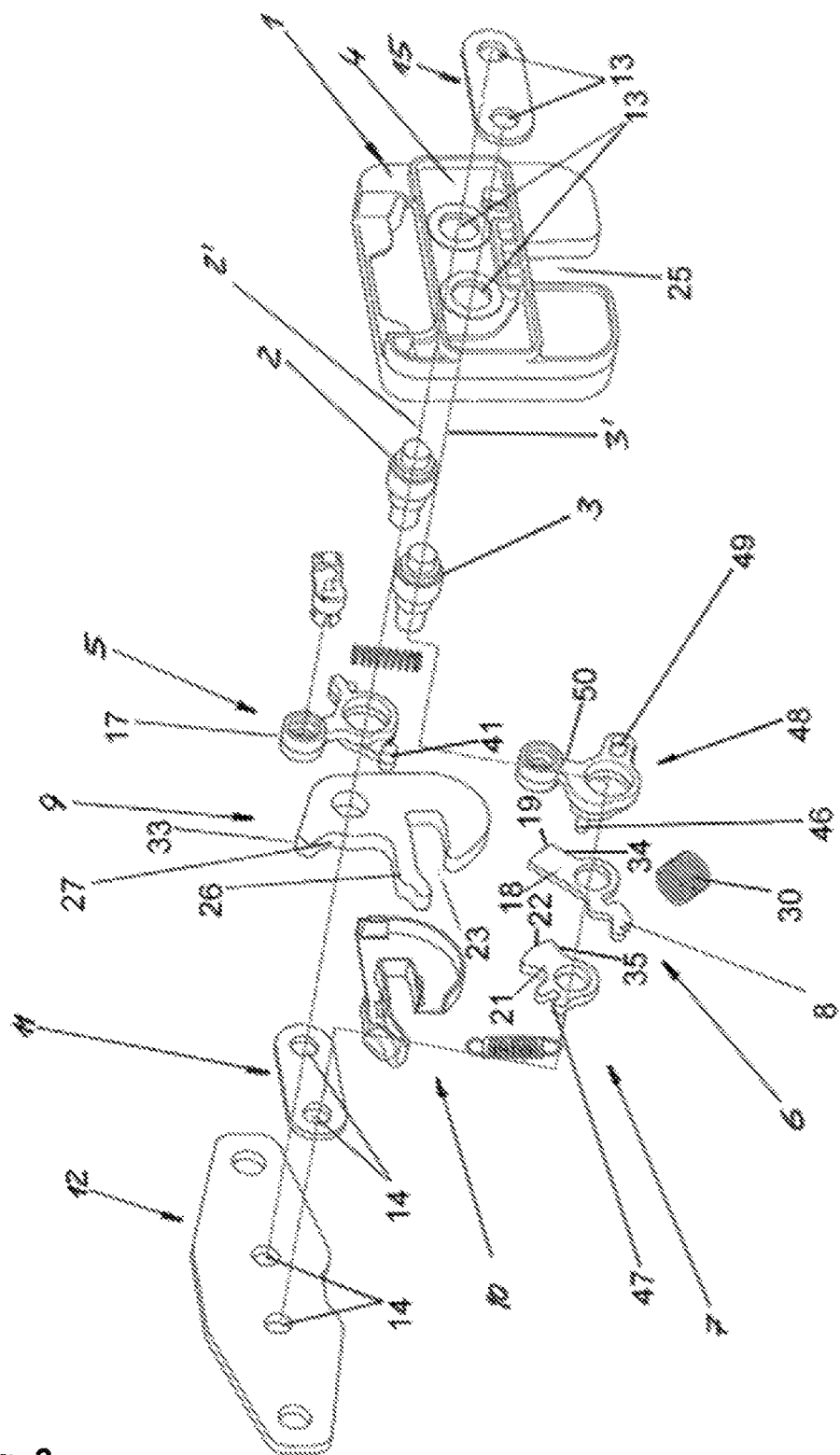
FIG. 3 shows an exploded illustration of a second exemplary embodiment of a locking device.
Figure 4:
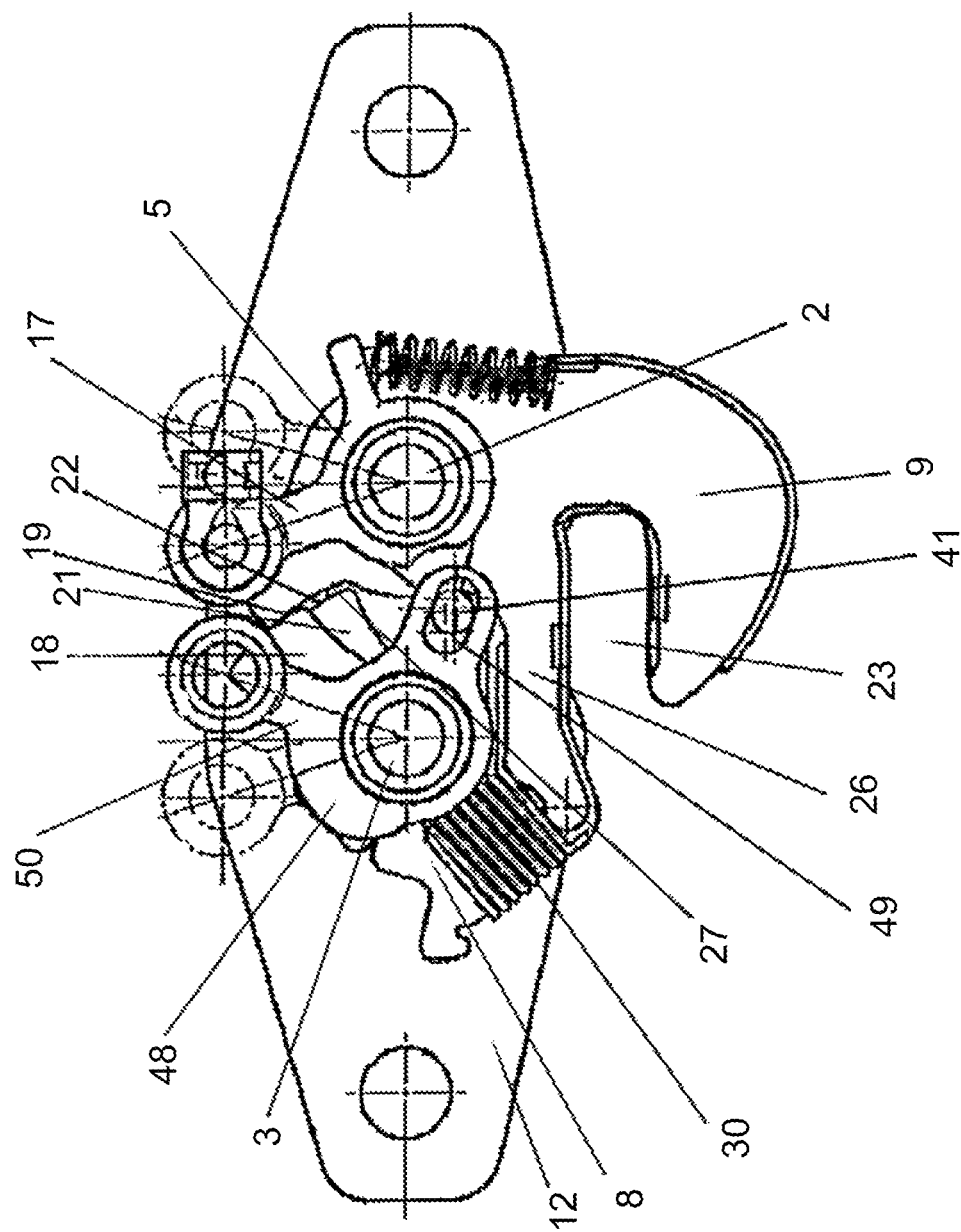
FIG. 4 shows an inner view of the locking device according to FIG. 3.

FIG. 3 shows an exploded illustration of a second exemplary embodiment of a locking device. The second exemplary embodiment is largely similar to the first exemplary embodiment; for this reason, components of similar type are represented by identical designations.

In the following text, essentially the differences between the first and the second exemplary embodiment will be described.

An unlocking slave 48, in addition to the clamping eccentric 6 and the catching eccentric 7, is mounted on the second axle pin 3 such that it can be pivoted about the second axis 3'.

The unlocking slave 48 has a journal-like driver 46 which extends parallel to the second axle pin 3 beyond the clamping eccentric 6 so as to protrude into a driving fork 47 of the catching eccentric 7.

Lying substantially diametrically opposite the driver 46, the unlocking slave 48 has a radially directed unlocking slave arm, in the free end region of which a radially extending coupling slot 49 is formed.

A second actuating arm 50 of the unlocking slave 48 extends radially at approximately 90 degrees with respect to the driver 46, on which actuating arm 50 a Bowden cable can act, by way of which the second actuating arm 50 can be pivoted in the counterclockwise direction into its unlocked condition.

The unlocking element 5 has an unlocking master arm which extends radially to the outside in the direction toward the unlocking slave 48. The unlocking master arm carries a coupling journal 41 which extends parallel to the first axle pin 2 and engages into the coupling slot 49 of the unlocking slave 48.

The unlocking element 5 and the unlocking slave 48 are coupled for driving one another via the coupling journal 41 and the coupling slot 49.

If the unlocking element 5 is pivoted in the unlocking direction, this rotational movement is transmitted via the driving coupling comprising coupling journal 41 and coupling slot 49 to the unlocking slave 48 which is then likewise pivoted in the unlocking direction.

If the unlocking slave 48 is pivoted in the unlocking direction, this rotational movement is likewise transmitted via the driving coupling comprising coupling journal 41 and coupling slot 49 to the unlocking element 5 which is then likewise pivoted in the unlocking direction.

If the unlocking slave 48 is pivoted in the locking direction, this rotational movement is also transmitted via the driving coupling comprising coupling journal 41 and coupling slot 49 to the unlocking element 5 which is then likewise pivoted in the locking direction.

The features which are disclosed in the above description, the claims and the drawings can be of significance both individually and in combination for the implementation of the invention in its various refinements.

LIST OF DESIGNATIONS

1 Housing
2 First axle pin
2' First axis
3 Second axle pin
3' Second axis
4 Floor
5 Unlocking element
6 Clamping eccentric
7 Catching eccentric
8 Spring action arm
9 Pawl
10 Cover
11 Second coupling plate
12 Housing cover
13 Bearing holes
14 Bearing holes
15 First coupling plate
16 Lug
17 Actuating arm
18 Clamping face arm
19 Clamping face
20 Driver recess
21 Catching face arm
22 Catching face
23 Hook throat
24 Pin
25 Pin receptacle
26 Finger
27 First functional face
28 Opening
29 Spiral coiled spring
30 Pawl compression spring
31 Catching eccentric driver
32 Clamping eccentric driver
33 Second functional face
34 Bearing face
35 Bearing face
41 Coupling journal
46 Driver
47 Driving fork
48 Unlocking slave
49 Coupling slot
50 Second actuating arm

The invention claimed is:
1. A locking device for a vehicle seat, comprising
a pawl which is mounted such that it can be pivoted about a first axis in order to lock a counterelement; and a clamping eccentric which is mounted such that it can be pivoted between a locked location and an unlocked location about a second axis which is parallel to the first axis and secures a locked state of the pawl by way of interaction with a first functional face of the pawl, the clamping eccentric acting in a spring-loaded manner via a clamping face on the first functional face in the locked state, wherein an unlocking element can be pivoted about the first axis by an actuating device counter to a spring force from a locked condition into an unlocked condition, wherein the clamping eccentric can be driven by the unlocking element such that it can be pivoted from its locked location in the direction of its unlocked location, wherein an unlocking slave is mounted such that it can be pivoted about the second axis from a locked condition into an unlocked condition, wherein the unlocking slave is coupled via a driving coupling to the unlocking element in such a way that the unlocking slave can be driven such that it can be moved from its locked condition into its unlocked condition by way of a pivoting movement of the unlocking element from the locked condition into the unlocked condition, wherein a catching eccentric which is mounted such that it can be pivoted about the second axis can be driven by the unlocking element such that it can be moved from its locked position into its unlocked position, which catching eccentric secures a locked state of the pawl by way of interaction with the first functional face of the pawl, it being possible for the pawl to be supported in the locked state by a catching face of the catching eccentric.

2. The locking device as claimed in claim 1, wherein the clamping eccentric and the catching eccentric are mounted such that they can be pivoted parallel to one another about the second axis, and the unlocking element has a radially protruding lug which extends axially over the width of the clamping eccentric and catching eccentric, in the case of pivoting of the unlocking element from its locked condition into its unlocked condition the lug moving the catching eccentric, via a radially protruding catching eccentric driver of the catching eccentric, from its locked position into its unlocked position and, lagging this movement, moving the clamping eccentric from its locked location into its unlocked location via a radially protruding clamping eccentric driver of the clamping eccentric.

3. The locking device as claimed in claim 2, wherein the catching eccentric has a driving recess which extends concentrically with respect to the second axis, the radial boundary of which in the unlocking direction is formed by the catching eccentric driver, and the radial boundary of which in the locking direction is formed by a driving wall.

4. The locking device as claimed in claim 1, wherein a prestressed pawl compression spring is supported with its one end on an arm of the clamping eccentric so as to spring-load the latter into its locked position and loads the pawl in the unlocking direction with its other end.

5. The locking device as claimed in claim 1, wherein the catching eccentric is spring-loaded in the direction of its locked position by a prestressed spring.

6. The locking device as claimed in claim 5, wherein the prestressed spring is a spiral coiled spring which is supported with its one end on a housing and protrudes with its other end into an opening which is formed in the catching eccentric at a radial spacing from the second axis.

7. A vehicle seat, comprising at least one locking device as claimed in claim 1.

* * * * *